United States Patent [19]

Hayashi et al.

[11] Patent Number: 5,802,216

[45] Date of Patent: Sep. 1, 1998

[54] APPARATUS AND METHOD FOR CONTRAST ADJUSTMENT BASED ON SINGLE FACTOR

[75] Inventors: Syuji Hayashi; Takayuki Furumoto, both of Osaka, Japan

[73] Assignee: Mita Industrial Co., Ltd., Osaka, Japan

[21] Appl. No.: 735,561

[22] Filed: Oct. 23, 1996

[30] Foreign Application Priority Data

Oct. 24, 1995 [JP] Japan .................................. 7-275982

[51] Int. Cl.⁶ .................................................. H04N 1/407
[52] U.S. Cl. ........................... 382/270; 382/274; 358/446; 348/673
[58] Field of Search ........................... 382/274, 275, 382/168, 172, 270; 358/519, 521, 461–466; 348/603, 615, 673, 678, 345, 357; 345/150, 153; H04N 1/407

[56] References Cited

U.S. PATENT DOCUMENTS 4,812,903 3/1989 Wagensonner et al. .
4,969,051 11/1990 Sasaki ..................................... 358/462
5,404,163 4/1995 Kubo ....................................... 348/345
5,502,776 3/1996 Manabe .................................. 382/172
5,619,229 4/1997 Kumaki .................................. 348/673

*Primary Examiner*—Kim Yen Vu
*Attorney, Agent, or Firm*—Rabin & Champagne, P.C.

[57] ABSTRACT

An apparatus and a method for contrast adjustment are provided which require a reduced amount of information for the contrast adjustment. A preliminary adjustment factor is first calculated on the basis of a contrast adjustment factor, and then input image data is processed on the basis of these two adjustment factors to provide contrast-adjusted image data. For example, the inclination of a contrast adjustment line is defined by the contrast adjustment factor, and a shift amount (intercept) of the contrast adjustment line is defined by the preliminary adjustment factor which is properly determined in correspondence with the contrast adjustment factor. Thus, not only the contrast of an image but also the density of the overall image can be properly adjusted simply by specifying a single adjustment factor.

11 Claims, 6 Drawing Sheets

β : CONTRAST ADJUSTMENT FACTOR

APPARATUS AND METHOD FOR CONTRAST ADJUSTMENT BASED ON SINGLE FACTOR

BACKGROUND OF THE INVENTION

1. Field of the Invention

The present invention relates to an apparatus and a method for contrast adjustment, which are applied to an apparatus such as a digital copying machine capable of contrast adjustment.

2. Description of Related Art

A color digital copying machine typically includes a scanner section for reading an original image and outputting image data, an image processing section for processing the image data outputted from the scanner section, and an image formation section for forming an image on the basis of the image data processed by the image processing section. The scanner section, for example, includes a color CCD (charge coupled device) for outputting three primary color signals on the basis of the additive process of red (R), green (G) and blue (B), and a color conversion section for converting the signals outputted from the color CCD into color image data on the basis of the subtractive process of cyan (C), magenta (M) and yellow (Y). The image formation section, for example, electrophotographically forms a color image on a paper sheet with the use of four color toners of cyan, magenta, yellow and black.

The color digital copying machine is used not only for reproducing an original color image faithfully, but also for processing the original image with some intention. One mode of the processing of the original image is contrast adjustment. The contrast adjustment is to adjust a density variation within the image, and is achieved by changing the degree of variation in the image density of output image data with respect to the input image data. More specifically, the contrast adjustment is achieved by increasing or decreasing the inclination of an output γ-characteristic line.

However, the contrast adjustment by changing the inclination of the output γ-characteristic line may result in an excessively bright image or an excessively dark image. To properly adjust the contrast of the image, the density of the overall image should be changed. More specifically, the contrast adjustment is performed by changing both the inclination and the intercept of the output γ-characteristic line.

However, the contrast adjustment requires two parameters for the inclination and intercept of the output γ-characteristic line. Where the contrast is to be changed on a level-by-level basis, for example, two parameter values for the inclination and the intercept should be prepared for each contrast level. More specifically, a table including two parameters for each contrast level is necessarily stored in a memory.

Therefore, a relatively large memory area in the memory is used for the storage of the parameters for the contrast adjustment. This problem is remarkable particularly where fine contrast adjustment is to be performed by employing a multiplicity of contrast levels.

Further, a relatively complicated process is required for reading out two parameters from the memory, thereby preventing the speed up of the image processing.

SUMMARY OF THE INVENTION

It is an object of the present invention to provide a contrast adjustment apparatus which requires a reduced amount of information for the contrast adjustment.

It is another object of the present invention to provide a contrast adjustment method which requires a reduced amount of information for the contrast adjustment.

In accordance with the present invention, a preliminary adjustment factor is calculated on the basis of a contrast adjustment factor, and then input image data is processed on the basis of these two adjustment factors for the contrast adjustment. Thus, contrast-adjusted image data is obtained. More specifically, the contrast adjustment can be performed on the basis of the two factors by inputting only one contrast adjustment factor.

For example, the inclination of a contrast adjustment line is determined by the contrast adjustment factor. Then, the preliminary adjustment factor corresponding to the contrast adjustment factor is properly determined, and a shift amount (intercept) of the contrast adjustment line is determined on the basis of the preliminary adjustment factor. Thus, not only the contrast of an image but also the density of the overall image can properly be adjusted by specifying the single adjustment factor. As a result, the contrast adjustment of the image can be achieved without giving an incongruent brightness to the image.

The present invention employs a reduced amount of information for the contrast adjustment. Where contrast adjustment factors are to be stored in a memory, for example, the storage thereof does not require a large memory area in the memory. In addition, the contrast adjustment process can be simplified, thereby allowing a high-speed operation.

The foregoing and other objects, features and advantages of the present invention will become apparent from the following detailed description of the preferred embodiments with reference to the attached drawings.

DETAILED DESCRIPTION OF THE PREFERRED EMBODIMENTS

Figure 1:
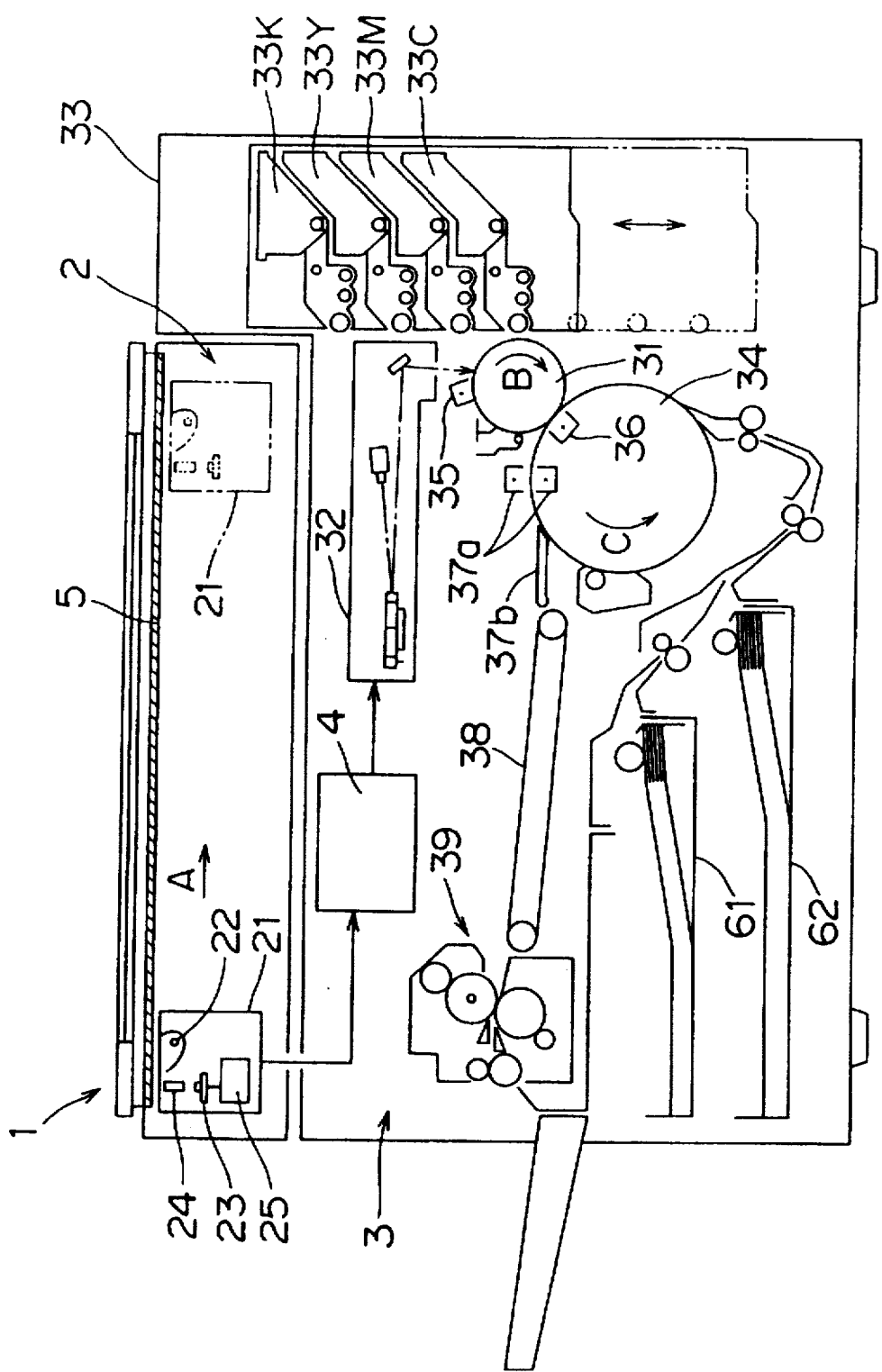
FIG. 1 is a schematic sectional view illustrating the internal construction of a digital color copying machine to which one embodiment of the present invention is applied.

FIG. 1 is a schematic sectional view illustrating the internal construction of a digital color copying machine to which one embodiment of the present invention is applied. The digital color copying machine includes a scanner section 2 for optically reading an original image, an image processing section 4 for processing the image read by the scanner section 2, and an output section 3 for reproducing the original image on a recording sheet on the basis of image data prepared by the image processing section 4, which are all accommodated in a copying machine body 1 thereof.

The scanner section 2 includes a scan reading section 21 reciprocally movable along an arrow A below a transparent document platen 5 on which a document original is placed. The scan reading section 21 includes a light source 22 for illuminating the document original, a color CCD 23 for sensing light reflected from the document original for photoelectric conversion, a selfoc lens 24 for focusing an optical image of the document original on the CCD 23, and a conversion circuit 25 for converting an output of the CCD 23 into digital color image data. The color CCD 23 has color filters, for example, of red (R), green (G) and blue (B) for each pixel, and outputs analog image signals for RGB components of each pixel. The conversion circuit 25 converts the analog image signals outputted from the CCD 23 into digital color image data indicative of the densities of cyan (C), magenta (M) and yellow (Y) components.

The output section 3 forms an image by using toners of four colors, e.g., cyan, magenta, yellow and black (BK). More specifically, the output section 3 includes a photoreceptor drum 31, a laser scanning section 32 for forming an electrostatic latent image on the surface of the photoreceptor 31, a developing unit 33 for developing the electrostatic latent image formed on the surface of the photoreceptor 31 into a toner image, and a transfer drum 34 for receiving the toner image transferred thereon from the surface of the photoreceptor 31.

During the image formation, the photoreceptor 31 is rotated at a constant rate in a direction of an arrow B in FIG. 1, and the transfer drum 34 is rotated at a constant rate in a direction of an arrow C in FIG. 1. On the other hand, the laser scanning section 32 exposes the surface of the photoreceptor 31 to a laser beam modulated on the basis of the image data applied from the image processing section 4. Before the exposure, the surface of the photoreceptor 31 is uniformly charged by a main charger 35. Therefore, the formation of an electrostatic latent image corresponding to an image to be finally formed is achieved by selective exposure to the laser beam. The electrostatic latent image is developed into a toner image by the developing unit 33, and the toner image is transferred onto a paper sheet wound around the transfer drum 34 by a transfer unit 36. Reference numerals 61 and 62 are sheet feeding cassettes, from either of which the paper sheet is fed to the transfer drum 34.

The laser scanning section 32 forms four images for cyan, magenta, yellow and black on the photoreceptor 31 on a one-by-one basis. The four images for cyan, magenta, yellow and black are respectively developed with cyan, magenta, yellow and black toners by a cyan developing unit 33C, a magenta developing unit 33M, a yellow developing unit 33Y and a black developing unit 33K in the developing unit 33.

The four color toner images are transferred onto one sheet wound around the transfer drum 34, and superimposed one on another. The sheet carrying the four color toner images transferred thereon is removed from the transfer drum 34 by the operations of a separation discharger 37a, a separation claw 37b and the like, and then introduced into the fixing unit 39 through a transportation belt 38. The fixing unit 39 fixes toner particles on the sheet by heat and press, and then discharges the sheet outside the copying machine body 1.

Figure 2:
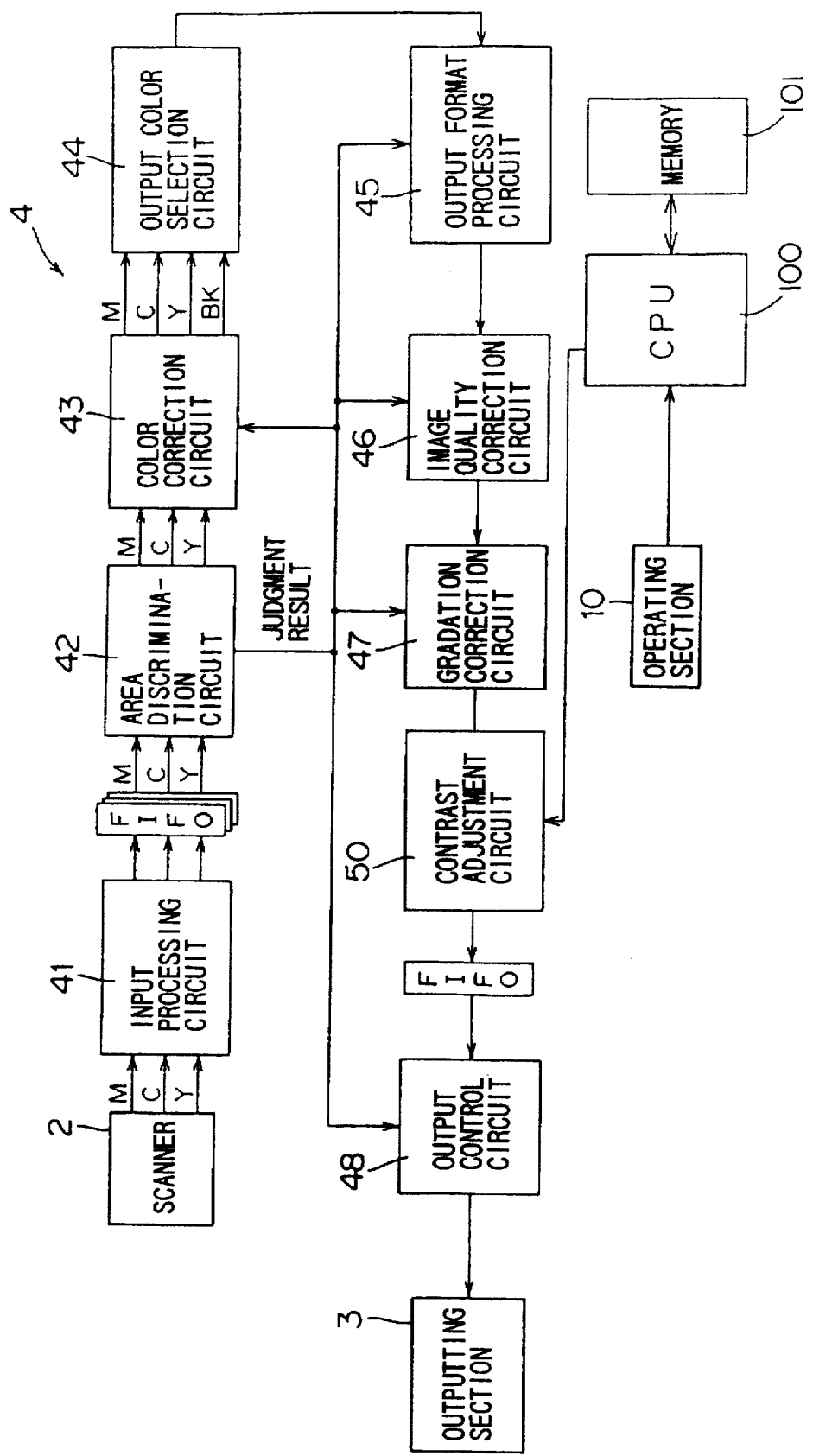
FIG. 2 is a block diagram illustrating the electrical construction of the digital color copying machine.

FIG. 2 is a block diagram for explaining the internal construction of the image processing section 4.

C-, M- and Y-color image data outputted from the scanner section 2 for each pixel are applied in parallel to an input processing circuit 41. The input processing circuit 41 deletes image data of a margin of a document original to prevent image formation on a margin of a sheet, and performs a process for adjusting an image formation position on the sheet. Further, the input processing section 41 judges on the basis of density levels of the C-, M- and Y-components whether the inputted image is a color image or a monochrome image.

Data outputted from the input processing circuit 41 are applied to an area discrimination circuit 42 via a FIFO (first-in first-out memory). The area discrimination circuit 42 judges which image area, among a character image area, a photographic area and a dotted image area, respective pixels belong to. The judgment result is applied to a color correction circuit 43, an output format circuit 45, an image quality correction circuit 46, a gradation adjustment circuit 47 and an output control circuit 48, and used for performing an appropriate process depending on the kinds of image areas to which the respective image pixels belong.

The image data subjected to the area discrimination process are inputted to the color correction circuit 43. The color correction circuit 43 performs a color adjustment process, a black formation process and a color correction process. In the color adjustment process, the brightness, hue or saturation of the image is changed. In the black formation process, the minimum value among the image data of the C-, M- and Y-components is detected and multiplied by a correction factor (e.g., 0.5 to 1.0) to generate image data of the BK-component. The product of the minimum value and the correction factor is subtracted from the image data of the C-, M- and Y-components. Further, in the color correction process, the inputted image data of the C-, M- and Y-components are processed on the basis of spectral characteristics of the color filters of the CCD 23 and the C-, M- and Y-color toners.

The C-, M-, Y- and BK-image data from the color correction circuit 43 are inputted to an output color selection circuit 44. The output color selection circuit 44 selects and outputs the C-, M-, Y- and BK-image data on a one-by-one basis in this order to the output format processing circuit 45.

The output format processing circuit 45 performs a mirror image process, a zoom process, a parallel displacement process or the like on the basis of an instruction from the CPU 100 to process the image data in accordance with a desired output format.

An output of the output format processing circuit 45 is applied to the image quality correction circuit 46, which performs an outline emphasis process for enhancing the clarity of the image or a softening process for reducing the stiffness of the image. The image data outputted from the image quality correction circuit 46 are further subjected to a gradation adjustment process which is performed by the gradation correction circuit 47, and then applied to a contrast adjustment circuit 50. The contrast adjustment circuit 50 performs image data processing for changing the contrast of the image on the basis of an instruction from the CPU 100. Data outputted from the contrast adjustment circuit 50 are applied to the output control circuit 48. The output control circuit 48 generates a laser irradiation signal which is to be applied to the laser scanning section 32 of the output section 3.

The CPU 100 centrally controls the respective components of the image processing section 4 ranging from the input processing circuit 41 to the output control circuit 48. The CPU 100 is connected to an operating section 10 provided on an upper face of the copying machine body 1 (see FIG. 1). The operating section 10 includes a start key for giving an instruction for starting a copying operation, ten keys for inputting the number of copies to be made, and a contrast adjustment input key for contrast adjustment. The CPU 100 is further connected to a memory 101 storing therein contrast adjustment factors β (which will be described later) to be fetched on the basis of an input from the contrast adjustment input key. In this embodiment, the contrast adjustment is performed on a level-by-level basis and, therefore, the contrast adjustment factors β preliminarily stored in the memory 101 correspond to respective contrast levels.

Figure 3:
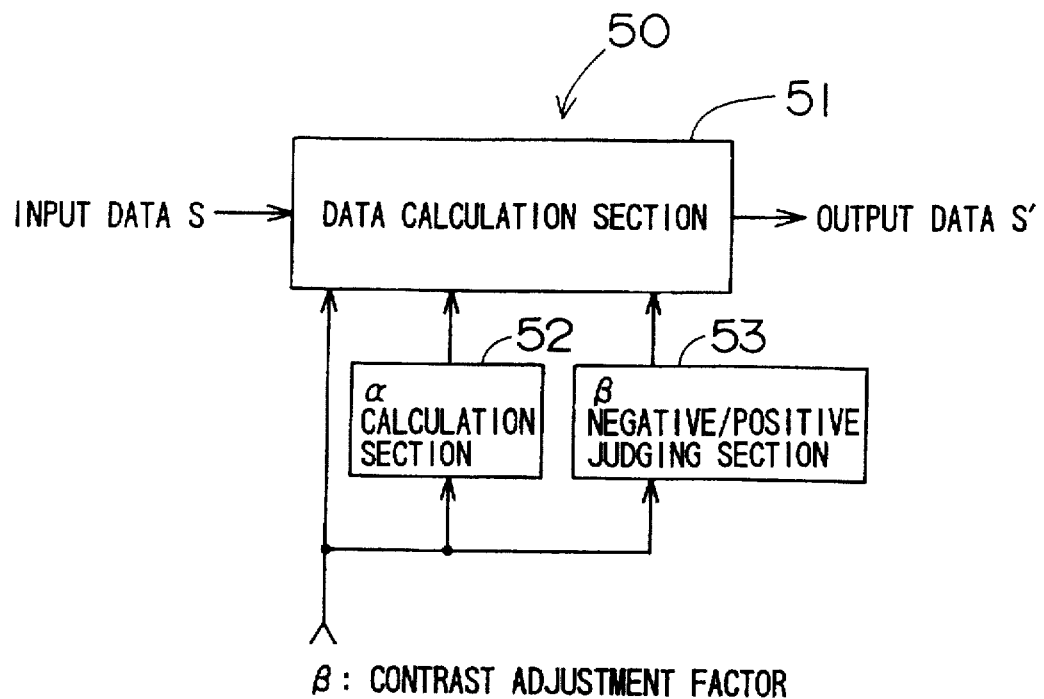
FIG. 3 is a block diagram illustrating the construction of a contrast adjustment circuit.

FIG. 3 is a functional block diagram for explaining the function of the contrast adjustment circuit 50. A contrast adjustment factor β is inputted from the CPU 100 to the contrast adjustment circuit 50. The contrast adjustment factor β is applied to a data calculation section 51, an α calculation section 52 and a β negative/positive judging section 53.

The data calculation section 51 processes input image data S on the basis of the following expression (1) or (2) to output contrast-adjusted image data S'. More specifically, the α calculation section 52 calculates a preliminary factor α from the following expression (3) on the basis of the inputted contrast adjustment factor β, and inputs the preliminary factor α to the data calculation section 51. The β negative/positive judging section 53 judges whether the value of the contrast adjustment factor β is negative or not less than zero, and inputs the judgment result to the data calculation section 51. By using the preliminary factor α applied from the α calculation section 52, the data calculation section 51 processes the input image data S in accordance with an expression selected from the following expressions (1) and (2) on the basis of the judgment result of the β negative/positive judging section 53.

If β≧0, $$S' = (\beta+1) \times (S-\alpha) + \alpha \quad (1)$$

If β<0, $$S' = \frac{1}{1-\beta} \times (S-\alpha) + \alpha \quad (2)$$

$$\alpha = \beta \times 8 + 128 \quad (3)$$

It should be noted that the input image data S and the output image data S' are provided for each of the C-, M-, Y- and BK-color components, and the densities thereof are each expressed on the basis of 256 gradation levels (8 bits) ranging from 0 to 255.

Figure 4:
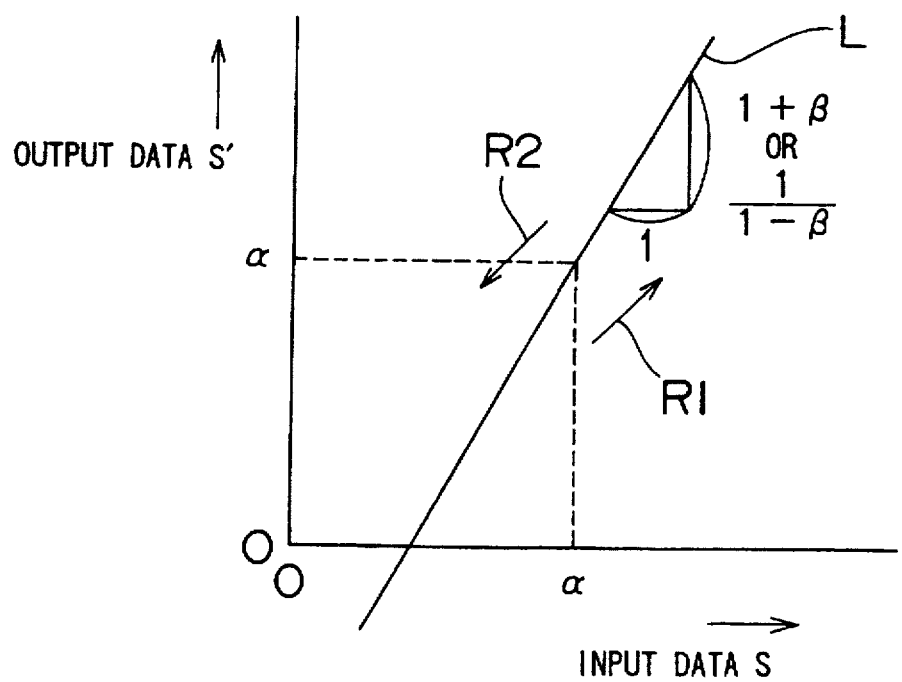
FIG. 4 is a graphical representation for explaining a contrast adjustment line.
Figure 5A:
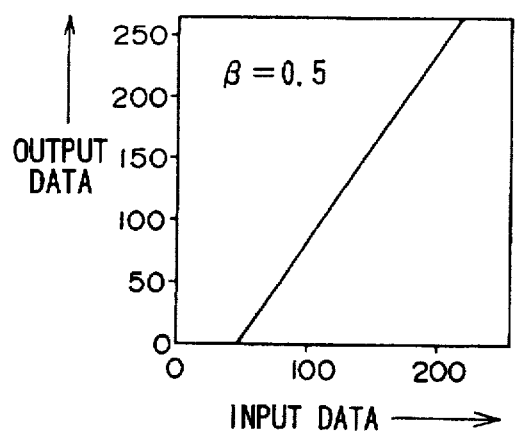
FIGS. 5A to 5E are graphical representations illustrating exemplary contrast adjustment lines for positive contrast adjustment factors.
Figure 5B:
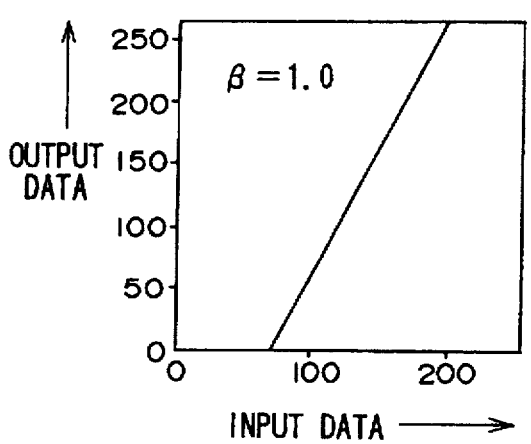
Figure 5C:
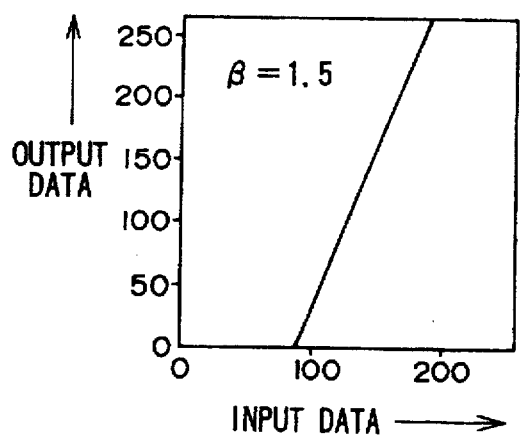
Figure 5D:
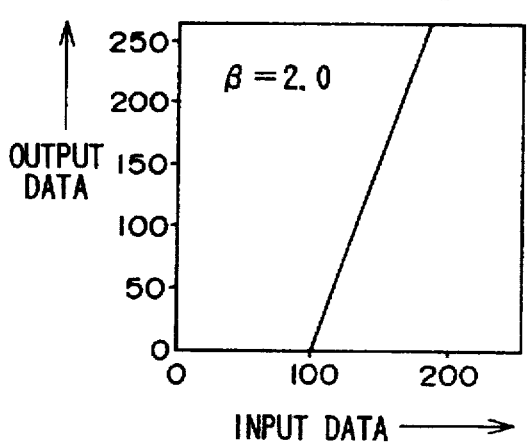
Figure 5E:
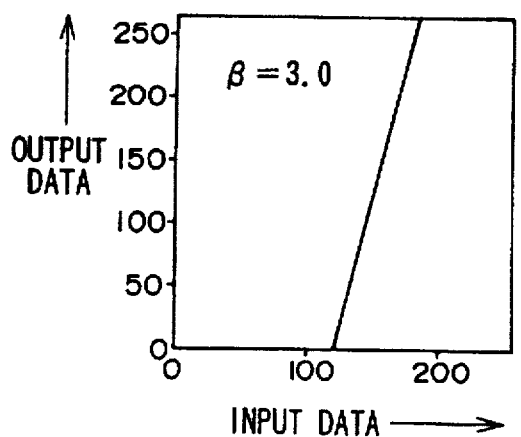
Figure 6A:
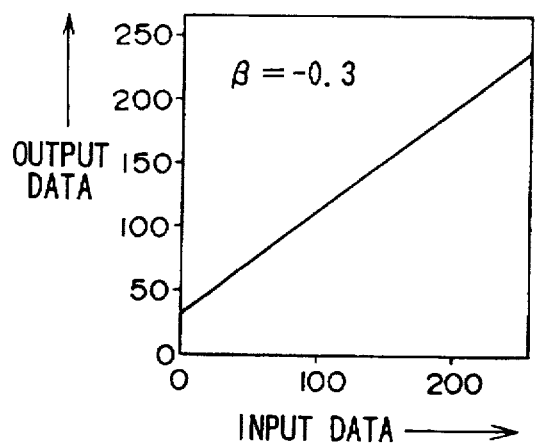
FIGS. 6A to 6E are graphical representations illustrating exemplary contrast adjustment lines for negative contrast adjustment factors.
Figure 6B:
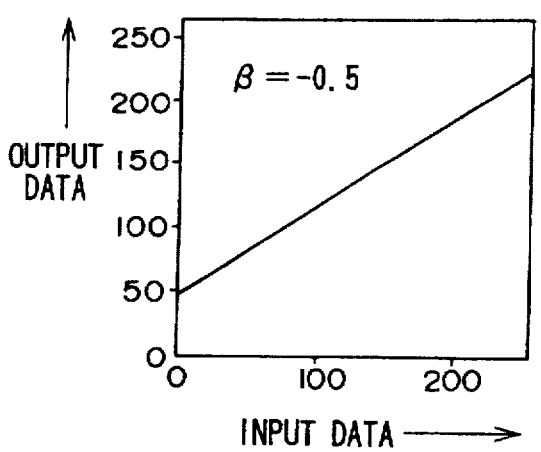
Figure 6C:
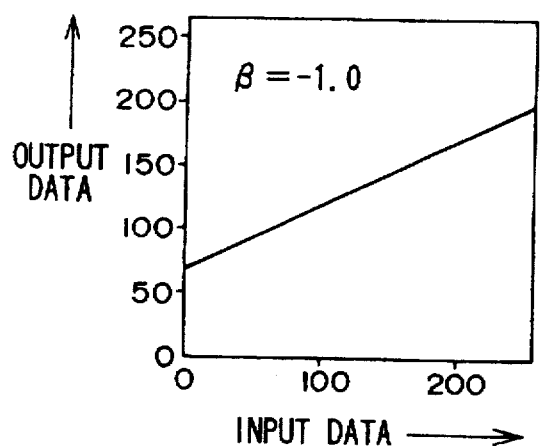
Figure 6D:
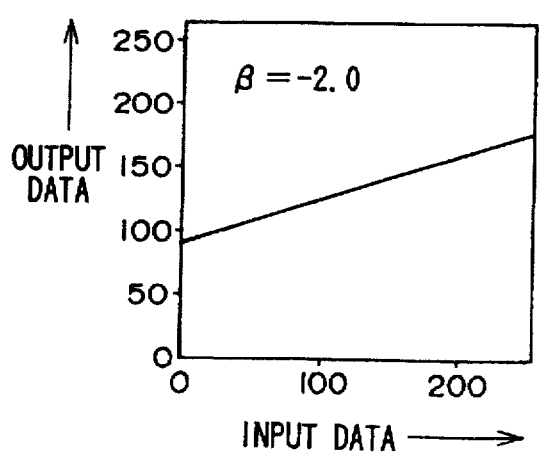
Figure 6E:
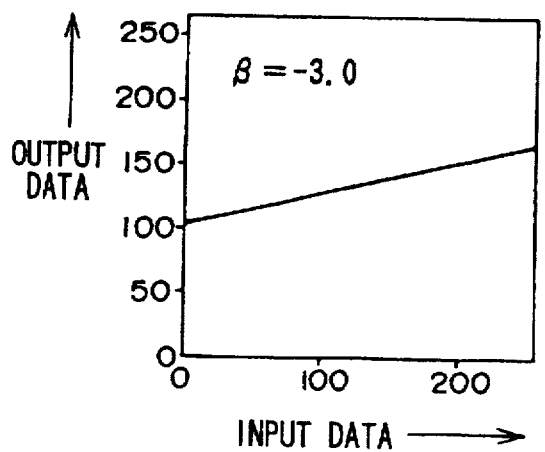

The expression (1) represents a line passing a point (α, α) and having an inclination of (β+1) in a plane of S-S' coordinates, and the expression (2) represents a line passing a point (α, α) and having an inclination of 1/(β−1) in the plane of S-S' coordinates. If β≧0, (β+1)≧1. If β<0, 0 ≦1/(β−1)<1. That is, the expressions (1) and (2) each define a contrast adjustment line L as shown in FIG. 4.

If the contrast is to be increased for a greater density variation in the image, the contrast adjustment factor β is set to a positive value. If the contrast is to be reduced for a smaller density variation in the image, the contrast adjustment factor β is set to a negative value. If the contrast adjustment factor β is set to 0, a predetermined standard contrast adjustment is performed.

If β≧0, in accordance with the expression (1), a greater β value leads to a greater inclination (β+1). If β=0, the input image data S equals the output image data S'. In accordance with this embodiment, therefore, the data inputted into the contrast adjustment circuit 50 is outputted as it is in the standard contrast adjustment.

If β<0, in accordance with the expression (2), a smaller β value (or a greater |β| value) leads to a smaller inclination.

The preliminary factor α determines a point through which the contrast adjustment line L passes in the plane of S-S' coordinates. That is, the preliminary factor α determines a shift amount (or intercept) of the contrast adjustment line L. If β≧0, a greater β value leads to a greater α value. If β<0, a smaller β value (or a greater |β| value) leads to a smaller α value. More specifically, the contrast adjustment line L in FIG. 4 is shifted in a direction of an arrow R1 with an increase in the contrast adjustment factor β, and shifted in a direction of an arrow R2 with a decrease in the contrast adjustment factor β.

Therefore, a greater β value leads to an increased density variation in the image to increase the contrast, and, at the same time, the density of the overall image is increased. On the contrary, a smaller β value leads to a reduced density variation in the image to reduce the contrast, and, at the same time, the density of the overall image is decreased.

FIGS. 5A to 5E are graphical representations illustrating exemplary contrast adjustment lines with contrast adjustment factors β to be employed when the contrast is to be increased (β>0). FIGS. 6A to 6E are graphical representations illustrating exemplary contrast adjustment lines with contrast adjustment factors β to be employed when the contrast is to be reduced (β<0).

Figure 7:
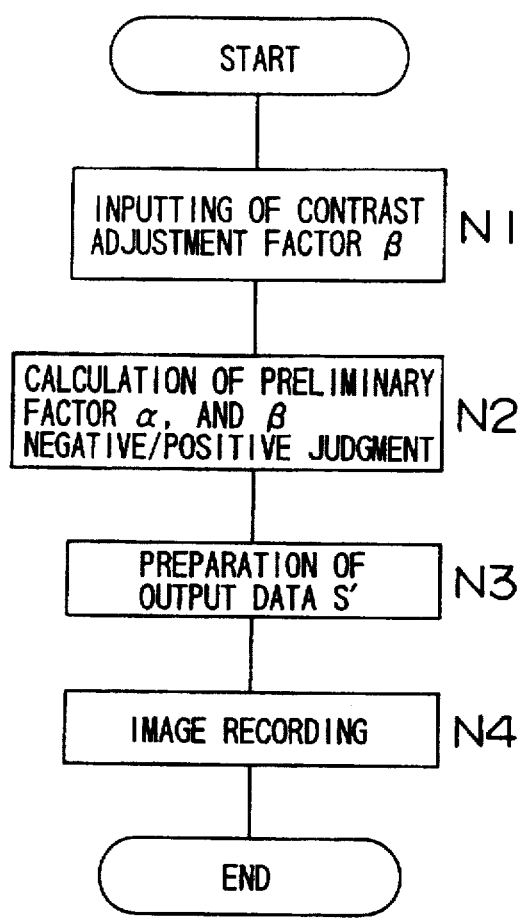
FIG. 7 is a flow chart for explaining the flow of a contrast adjustment process.

FIG. 7 is a flow chart for explaining the flow of a contrast adjustment process. For the contrast adjustment, an operator operates the contrast adjustment input key of the operation section 10. In response thereto, the CPU 100 fetches from the memory 101 a contrast adjustment factor β corresponding to a signal from the operation section 10, and inputs the fetched factor β to the contrast adjustment circuit 50 (Step N1).

The contrast adjustment factor β is applied to the data calculation section 41, the α calculation section 52 and the β negative/positive judging section 53 in the contrast adjustment circuit 50. The α calculation section 52 calculates a preliminary factor α from the expression (3), and the β negative/positive judging section 53 judges whether the value of the contrast adjustment factor β is not less than 0 (Step N2).

The data calculation section 51 processes the input data S in accordance with the expression (1) or (2) on the basis of the calculation result obtained by the α calculation section 52 and the judgment result obtained by the β negative/positive judging section 53 to prepare output data S' (Step N3). By applying the output data S' to the output control circuit 48 (see FIG. 2), a contrast-adjusted image is formed on a recording sheet by operation of the output section 3 (Step N4).

In accordance with this embodiment, upon input of the contrast adjustment factor β defining the inclination of the contrast adjustment line from the CPU 100, the preliminary factor α defining the intercept of the line is automatically calculated. The contrast adjustment merely requires the input of the single factor β. Therefore, even if a multiplicity of contrast levels are provided, the storage of the factors β does not require a large memory area in the memory 101, allowing for efficient utilization of the remaining memory area in the memory 101. Since the multiple-level contrast adjustment can be achieved without oppressing the storage capacity of the memory 101, more precise contrast adjustment can be realized.

Further, since both the inclination and the intercept of the contrast adjustment line are properly changed simply by inputting the single adjustment factor β, the contrast adjustment of the image can be properly performed without giving an incongruent brightness to the image.

Still further, the single adjustment factor β is applied from the CPU 100 to the contrast adjustment circuit 50 and, therefore, the time required for reading the data from the memory 101 and the time required for applying the data to the contrast adjustment circuit 50 can be shortened in comparison with the prior art, thereby improving the throughput and the image data processing efficiency of the image processing section 4.

While the embodiment of the present invention has thus been described, the invention is not limited to the aforesaid embodiment. Although the preliminary factor α is calculated from the expression (3) in the aforesaid embodiment, the expression (3) is merely one example. Alternatively, the expression (4) or (5) may be employed for the calculation of the preliminary factor α.

$$\alpha = \begin{cases} -2^{-\beta} + 127 & (\text{if } \beta < 0) \\ 2^{\beta} + 127 & (\text{if } \beta \geq 0) \end{cases} \quad (4)$$

$$\alpha = \begin{cases} -2^{(-\beta+2)} + 124 & (\text{if } \beta < 0) \\ 2^{(\beta+2)} + 124 & (\text{if } \beta \geq 0) \end{cases} \quad (5)$$

Further, the expression (1) or (2) is also merely one example. Alternatively, the contrast-adjusted image data S' may be calculated from the following expression (6).

$$S' = \frac{\alpha}{128}(S-\alpha) + \frac{1}{2}(\alpha - 128) + 128 \quad (6)$$

wherein 0≦α<256.

Although the present invention is applied to the digital color copying machine in the aforesaid embodiment, the invention can be widely applied to any of various apparatuses such as monochrome digital copying machines, facsimile machines and image scanners which are capable of performing contrast adjustment. Further, the invention can be applied to an image processing operation to be performed by a personal computer. Particularly, where the contrast of an image is adjusted on such a personal computer, a high-speed operation can be ensured because the contrast adjustment basically requires only one factor.

Although the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

What is claimed is:

1. A method for contrast adjustment, which is adapted to process input image data on the basis of a contrast adjustment factor to provide contrast-adjusted image data, the method comprising:

a preliminary adjustment factor calculation step of calculating a preliminary adjustment factor on the basis of the contrast adjustment factor, and an image data preparation step of performing a contrast adjustment process on the input image data on the basis of the contrast adjustment factor and the preliminary adjustment factor to provide the contrast-adjusted image data;

wherein the input image data is processed in the data preparation step for preparation of the output image data so that the degree of a change of the output image data with respect to the input image data and a density of an overall output image are increased with an increase in the contrast adjustment factor.

2. An apparatus for contrast adjustment, which processes input image data on the basis of an inputted contrast adjustment factor to output contrast-adjusted image data, the apparatus comprising:

preliminary adjustment factor calculation means for calculating a preliminary adjustment factor on the basis of the contrast adjustment factor;

data processing means for performing a contrast adjustment process on the input image data on the basis of the contrast adjustment factor and the preliminary adjustment factor, and outputting the processed image data;

contrast adjustment input means for setting a contrast to any of a plurality of contrast levels;

storage means for storing therein contrast adjustment factors corresponding to the respective contrast levels capable of being set by the contrast adjustment means; and data transfer means for reading a contrast adjustment factor from the storage means in response to an input operation of the contrast adjustment input means, and transferring the contrast adjustment factor thus read out to the preliminary factor calculation means and the data processing means.

3. An apparatus for contrast adjustment, which processes input image data on the basis of an inputted contrast adjustment factor to output contrast-adjusted image data, the apparatus comprising:

preliminary adjustment factor calculation means for calculating a preliminary adjustment factor on the basis of the contrast adjustment factor; and data processing means for performing a contrast adjustment process on the input image data on the basis of the contrast adjustment factor and the preliminary adjustment factor, and outputting the processed image data;

wherein the data processing means processes the input image data for preparation of the output image data so that a degree of a change of the output image data with respect to the input image data and a density of an overall output image are increased with an increase in the contrast adjustment factor.

4. An apparatus for contrast adjustment, which processes input image data on the basis of an inputted contrast adjustment factor to output contrast-adjusted image data, the apparatus comprising:

preliminary adjustment factor calculation means for calculating a preliminary adjustment factor on the basis of the contrast adjustment factor; and data processing means for performing a contrast adjustment process on the input image data on the basis of the contrast adjustment factor and the preliminary adjustment factor, and outputting the processed image data;

wherein the data processing means processes the input image data S on the basis of the following expression by using the preliminary adjustment factor α and the contrast adjustment factor β to provide the output image data S':

if β≧0, $$S' = (\beta+1) \times (S-\alpha) + \alpha$$

if β<0, $$S' = \frac{1}{1-\beta} \times (S-\alpha) + \alpha.$$

5. An apparatus as set forth in claim 4, wherein the preliminary adjustment factor calculation means calculates the preliminary adjustment factor α from the following expression:

$$\alpha = \beta \times 8 + 128.$$

6. An apparatus as set forth in claim 4, wherein the preliminary adjustment factor calculation means calculates the preliminary adjustment factor α from the following expression:

$$\alpha = \begin{cases} -2^{-\beta} + 127 & (\text{if } \beta < 0) \\ 2^{\beta} + 127 & (\text{if } \beta \geq 0). \end{cases}$$

7. An apparatus as set forth in claim 4, wherein the preliminary adjustment factor calculation means calculates the preliminary adjustment factor α from the following expression:

$$\alpha = \begin{cases} -2^{(-\beta+2)} + 124 & (\text{if } \beta < 0) \\ 2^{(\beta+2)} + 124 & (\text{if } \beta \geq 0). \end{cases}$$

8. An apparatus for contrast adjustment, which processes input image data on the basis of an inputted contrast adjustment factor to output contrast-adjusted image data, the apparatus comprising:

preliminary adjustment factor calculation means for calculating a preliminary adjustment factor on the basis of the contrast adjustment factor; and data processing means for performing a contrast adjustment process on the input image data on the basis of the contrast adjustment factor and the preliminary adjustment factor, and outputting the processed image data;

wherein the data processing means processes the input image data S on the basis of the following expression by using the preliminary adjustment factor α and the contrast adjustment factor β to provide the output image data S':

$$S' = \frac{\alpha}{128} (S - \alpha) + \frac{1}{2} (\alpha - 128) + 128$$

wherein $0 \leq \alpha < 256$.

9. An apparatus as set forth in claim 8, wherein the preliminary adjustment factor calculation means calculates the preliminary adjustment factor a from the following expression:

$$\alpha = \beta \times 8 + 128.$$

10. An apparatus as set forth in claim 8, wherein the preliminary adjustment factor calculation means calculates the preliminary adjustment factor a from the following expression:

$$\alpha = \begin{cases} -2^{-\beta} + 127 & (\text{if } \beta < 0) \\ 2^{\beta} + 127 & (\text{if } \beta \geq 0). \end{cases}$$

11. An apparatus as set forth in claim 8, wherein the preliminary adjustment factor calculation means calculates the preliminary adjustment factor a from the following expression:

$$\alpha = \begin{cases} -2^{(-\beta+2)} + 124 & (\text{if } \beta < 0) \\ 2^{(\beta+2)} + 124 & (\text{if } \beta \geq 0). \end{cases}$$

* * * * *